(12) United States Patent
Lv (10) Patent No.: US 10,498,952 B2
(45) Date of Patent: Dec. 3, 2019

(54) SHOOTING METHOD AND SHOOTING SYSTEM CAPABLE OF REALIZING DYNAMIC CAPTURING OF HUMAN FACES BASED ON MOBILE TERMINAL

(71) Applicant: Huizhou TCL Mobile Communication Co., LTD., HuiZhou (CN)

(72) Inventor: Jinfeng Lv, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 0 days.

(21) Appl. No.: 15/570,729

(22) PCT Filed: Oct. 25, 2016

(86) PCT No.: PCT/CN2016/103162
§ 371 (c)(1),
(2) Date: Oct. 30, 2017

(87) PCT Pub. No.: WO2017/124792
PCT Pub. Date: Jul. 27, 2017

(65) Prior Publication Data
US 2018/0295278 A1    Oct. 11, 2018

(30) Foreign Application Priority Data
Jan. 21, 2016  (CN) .......................... 2016 1 0039349

(51) Int. Cl.
*H04N 5/232* (2006.01)
*G06K 9/00* (2006.01)
(Continued)

(52) U.S. Cl.
CPC ..... *H04N 5/23219* (2013.01); *G06K 9/00255* (2013.01); *H04N 5/2251* (2013.01); *H04N 5/2258* (2013.01); *H04N 5/23203* (2013.01); *H04N 5/23296* (2013.01); *H04N 5/23299* (2018.08); *H04N 5/247* (2013.01)

(58) Field of Classification Search
CPC ........ G08B 13/19608; G08B 13/19606; G08B 13/19645; G08B 13/19641; G08B 13/19684; G08B 13/19643; G06T 7/292; G06T 7/269; H04N 5/23296;
(Continued)

(56) References Cited

U.S. PATENT DOCUMENTS 9,888,169 B2 *  2/2018  Laaksonen .......... H04N 5/23216
9,894,287 B2 *  2/2018  Qian ....................... G06T 5/007
(Continued)

FOREIGN PATENT DOCUMENTS

CN        104967774 A  * 10/2015

*Primary Examiner* — Chiawei Chen (57) ABSTRACT

The present invention discloses a method, a system, and a mobile terminal for dynamically capturing a face for video taking, which adjusts the positions of a face recognition camera and a main camera according to face position information collected by the face recognition camera during shooting, such that an image of a person is taken at a central area of the picture, and at the same time, collects an original image in a visual angle of the main camera. The present invention can realize dynamic capture of shooting object positions to promptly take a picture of a face.

20 Claims, 4 Drawing Sheets

(51) Int. Cl.
*H04N 5/247* (2006.01)
*H04N 5/225* (2006.01)

(58) Field of Classification Search
CPC ......... H04N 5/23222; H04N 5/23216; H04N 5/23299; H04N 5/2628; H04N 5/23219
See application file for complete search history.

(56) References Cited

U.S. PATENT DOCUMENTS

| | | | | |
|---|---|---|---|---|
| 2006/0104487 | A1* | 5/2006 | Porter | G06K 9/00228 382/118 |
| 2007/0098218 | A1* | 5/2007 | Zhang | G06K 9/00228 382/103 |
| 2010/0026831 | A1* | 2/2010 | Ciuc | G06K 9/00221 348/222.1 |
| 2010/0073497 | A1* | 3/2010 | Katsumata | G06K 9/00315 348/211.99 |
| 2011/0058051 | A1* | 3/2011 | Jeon | G06F 3/012 348/211.11 |
| 2011/0085016 | A1* | 4/2011 | Kristiansen | G06F 3/04883 348/14.03 |
| 2011/0129210 | A1* | 6/2011 | McGucken | F16M 13/02 396/422 |
| 2011/0141316 | A1* | 6/2011 | Kubota | G06K 9/00221 348/234 |
| 2011/0285808 | A1* | 11/2011 | Feng | H04N 7/142 348/14.09 |
| 2012/0027267 | A1* | 2/2012 | Kim | G06F 3/0418 382/118 |
| 2013/0033607 | A1* | 2/2013 | Ohta | G03B 15/00 348/169 |
| 2013/0107103 | A1* | 5/2013 | Kato | G06F 3/0481 348/333.12 |
| 2013/0258160 | A1* | 10/2013 | Yoshioka | H04N 5/23293 348/333.11 |
| 2013/0342720 | A1* | 12/2013 | Azami | H04N 9/04 348/222.1 |
| 2014/0049595 | A1* | 2/2014 | Feng | H04N 7/15 348/14.08 |
| 2015/0084984 | A1* | 3/2015 | Tomii | H04N 5/232 345/619 |
| 2015/0264258 | A1* | 9/2015 | Bervoets | H04N 5/23238 348/36 |
| 2015/0339805 | A1* | 11/2015 | Ohba | G06F 3/011 345/156 |
| 2015/0350556 | A1* | 12/2015 | Lee | H04N 5/23219 348/143 |
| 2015/0350769 | A1* | 12/2015 | Sun | G06K 9/00221 348/14.08 |
| 2016/0055648 | A1* | 2/2016 | Liu | H04N 5/23229 382/103 |
| 2016/0142655 | A1* | 5/2016 | MacMillan | G06T 3/0068 348/38 |
| 2016/0150159 | A1* | 5/2016 | Lytle | H04N 5/23206 348/208.3 |
| 2016/0286119 | A1* | 9/2016 | Rondinelli | G03B 17/12 |
| 2016/0323504 | A1* | 11/2016 | Ono | H04N 5/2259 |
| 2016/0350587 | A1* | 12/2016 | Bataller | G06T 7/80 |
| 2016/0373650 | A1* | 12/2016 | Kim | H04N 5/23216 |
| 2017/0061210 | A1* | 3/2017 | Ollila | G06K 9/00604 |
| 2017/0111570 | A1* | 4/2017 | Yoon | H04B 1/40 |
| 2017/0193300 | A1* | 7/2017 | Shatz | G06K 9/00671 |
| 2018/0189550 | A1* | 7/2018 | McCombe | G06K 9/00288 |
| 2018/0307310 | A1* | 10/2018 | McCombe | H04N 13/239 |

* cited by examiner

SHOOTING METHOD AND SHOOTING SYSTEM CAPABLE OF REALIZING DYNAMIC CAPTURING OF HUMAN FACES BASED ON MOBILE TERMINAL

TECHNICAL FIELD

The present invention relates to the field of mobile terminal technologies, and in particular to a method, a system, and a mobile terminal for dynamically capturing a face for video taking.

BACKGROUND

At present, smart picture taking devices are increasingly popular, which are used more and more frequently by people. Along with the increased use, people have imposed higher requirements for convenience and intelligence of the picture taking. When people are using these smart picture taking devices to take pictures, the relative position between a person and the device is always in dynamic change, to keep the person always at a proper position in the image, it is necessary for people to separately adjust the picture-taking position of the camera in real time, and to constantly pay attention to the position of the person in the image. As a result, when the device is used for a long time, the video taking process has complicated operations and is not convenient for the user.

Therefore, the prior art needs to be improved.

SUMMARY

In an embodiment, a method, a system, and a mobile terminal for dynamically capturing a face for video taking is provided.

In an embodiment, a mobile terminal camera-based method for dynamically capturing a face for video taking is provided, comprising:
A. Providing a first camera and a second camera on a mobile terminal in advance to form a camera module, said camera module being disposed on the mobile terminal body through a rotation mechanism;
B. During shooting, controlling the first camera to collect face position information, and controlling the second camera to collect original images in the visual angle;
C. According to the face position information collected by the first camera, adjusting the position of the first camera through the rotation mechanism, and controlling such that pictures taken by the first camera always place people to be taken in the central area of the pictures; and
D. According to the adjusted positions, the first camera and the second camera perform image collection processing on images in the visual angles of the cameras.

In a further embodiment, the mobile terminal camera-based method for dynamically capturing a face for video taking, wherein during shooting, controlling the first camera to collect face position information specifically comprises: controlling the first camera to collect face position information and recognizing the face position.

In a further embodiment, the mobile terminal camera-based method for dynamically capturing a face for video taking, wherein the block C comprises: According to the face position information collected by the first camera, adjusting the position of the first camera through the rotation mechanism, and controlling such that pictures taken by the first camera always place people to be taken in the central area of the pictures specifically comprises:

C1. According to the face position information collected by the first camera, calculating the position of the face in the current picture taken for preview;
C2. According to the calculated position where the face is at in the current picture taken for preview, further calculating deviation data with respect to placing people to be taken in the central area of the picture;
C3. According to the deviation data, generating a corresponding position adjustment command to control the first camera to perform position adjustment;
C4. According to the generated position adjustment command, adjusting the position of the first camera, and controlling such that pictures taken by the first camera always place people to be taken in the central area of the pictures.

In a further embodiment, the mobile terminal camera-based method for dynamically capturing a face for video taking, wherein the block C3 comprises:
According to the deviation data, generating a corresponding position adjustment command to control the first camera to perform position adjustment further comprises:
C3. According to the deviation data, generating a corresponding lateral position adjustment command or vertical position adjustment command to control the first camera.

In a further embodiment, the mobile terminal camera-based method for dynamically capturing a face for video taking, wherein the block C4 comprises:
According to the generated position adjustment command, adjusting the position of the first camera, and controlling such that pictures taken by the first camera always place people to be taken in the central area of the pictures further comprises:
C41. When a lateral position adjustment command is generated, controlling to adjust the lateral position of the first camera, so as to control such that pictures taken by the first camera always place people to be taken in the central area of the pictures;
C42. When a vertical position adjustment command is generated, controlling to adjust the vertical position of the first camera, so as to control such that pictures taken by the first camera always place people to be taken in the central area of the pictures.

In a further embodiment, the mobile terminal camera-based method for dynamically capturing a face for video taking, wherein the block C comprises: According to the face position information collected by the first camera, adjusting the position of the first camera through the rotation mechanism, and controlling such that pictures taken by the first camera always place people to be taken in the central area of the pictures further comprises:
C20. Performing data processing on face feature data collected by the first camera, calculating the range of the face image, and calculating to obtain a central point of the face image according to the image range;
C21. Calculating the relative position of the central point of the face image relative to the central point of the image of the first camera, and obtaining $\Delta X$ and $\Delta Y$, wherein $\Delta X$ represents the lateral position information of the central point of the face image relative to the central point of the image; $\Delta Y$ represents the vertical position information of the central point of the face image relative to the central point of the image;
C23. According to the calculated data of $\Delta X$ and $\Delta Y$, generating a lateral position adjustment command and a vertical position adjustment command;
C24. According to the generated lateral position adjustment command and vertical position adjustment command, respectively, controlling the given lateral position information of the central point of the face image relative to the central point of the image, adjusting the position of the second camera, such that $\Delta X$ trends to 0; and according to the given vertical position information of the central point of the face image relative to the central point of the image, adjusting the position of the second camera, such that $\Delta Y$ trends to 0.

In a further embodiment, the mobile terminal camera-based method for dynamically capturing a face for video taking, wherein the first camera is a face recognition camera, and the second camera is a main camera.

In another embodiment, a mobile terminal camera-based system for dynamically capturing a face for video taking is provided, comprising:

An advance setting module, configured to provide a face recognition camera and a main camera on a mobile terminal in advance;

An image collection control module, configured to, during shooting, control the face recognition camera to collect face position information, and control the main camera to collect original images in the visual angle;

A data processing and control module, configured to, according to the face position information collected by the face recognition camera, adjust the position of the face recognition camera, and control such that pictures taken by the face recognition camera always place people to be taken in the central area of the pictures; and A picture taking module, configured to control the face recognition camera and the main camera to perform, according to the adjusted positions, image collection processing on images in the visual angles of the cameras.

In a further embodiment, the mobile terminal camera-based system for dynamically capturing a face for video taking, wherein the image collection control module is specifically configured to:

control the face recognition camera to collect face position information and recognize the face position.

In a further embodiment, the mobile terminal camera-based system for dynamically capturing a face for video taking, wherein the data processing and control module comprises:

A first calculation unit, configured to, according to the face position information collected by the face recognition camera, calculate the position of the face in the current picture taken for preview;

A second calculation unit, configured to, according to the calculated position where the face is at in the current picture taken for preview, further calculate deviation data with respect to placing people to be taken in the central area of the picture;

A position adjusting unit, configured to, according to the deviation data, generate a corresponding position adjustment command to control the face recognition camera to perform position adjustment;

A control unit, configured to, according to the generated position adjustment command, adjust the position of the face recognition camera, and control such that pictures taken by the face recognition camera always place people to be taken in the central area of the pictures.

In a further embodiment, the mobile terminal camera-based system for dynamically capturing a face for video taking, wherein the data processing and control module further comprises:

A first command generation unit, configured to, according to the deviation data, generate a corresponding lateral position adjustment command or vertical position adjustment command to control the face recognition camera.

In a further embodiment, the mobile terminal camera-based system for dynamically capturing a face for video taking, wherein the data processing and control module further comprises:

A lateral position adjustment unit, configured to, when a lateral position adjustment command is generated, control to adjust the lateral position of the face recognition camera, so as to control such that pictures taken by the face recognition camera always place people to be taken in the central area of the pictures; and A vertical position adjustment unit, configured to, when a vertical position adjustment command is generated, control to adjust the vertical position of the face recognition camera, so as to control such that pictures taken by the face recognition camera always place people to be taken in the central area of the pictures.

In a further embodiment, the mobile terminal camera-based system for dynamically capturing a face for video taking, wherein the data processing and control module further comprises:

A third calculation unit, configured to perform data processing on face feature data collected by the face recognition camera, calculate the range of the face image, and calculate to obtain a central point of the face image according to the image range;

A fourth calculation unit, configured to calculate the relative position of the central point of the face image relative to the central point of the image of the face recognition camera, and obtain $\Delta X$ and $\Delta Y$, wherein $\Delta X$ represents the lateral position information of the central point of the face image relative to the central point of the image; $\Delta Y$ represents the vertical position information of the central point of the face image relative to the central point of the image;

A second command generation unit, configured to, according to the calculated data of $\Delta X$ and $\Delta Y$, generate a lateral position adjustment command and a vertical position adjustment command;

An adjustment control unit, configured to, according to the generated lateral position adjustment command and vertical position adjustment command, respectively, control the given lateral position information of the central point of the face image relative to the central point of the image, adjust the position of the main camera, such that $\Delta X$ trends to 0; and according to the given vertical position information of the central point of the face image relative to the central point of the image, adjusting the position of the main camera, such that $\Delta Y$ trends to 0.

In another embodiment, a mobile terminal is provided, comprising: Providing a first camera and a second camera on the mobile terminal in advance to form a camera module, said camera module being disposed on the mobile terminal body through a rotation mechanism;

One or more processors;

A memory; and

One or more programs, wherein said one or more programs are stored in the memory and configured to be executed by said one or more processors, and said one or more programs comprise commands for the following operations:

During shooting, controlling the first camera to collect face position information, and controlling the second camera to collect original images in the visual angle;

According to the face position information collected by the first camera, adjusting the position of the first camera through the rotation mechanism, and controlling such that pictures taken by the first camera always place people to be taken in the central area of the pictures; and According to the adjusted positions, the first camera and the second camera perform image collection processing on images in the visual angles of the cameras.

In a further embodiment, the mobile terminal, wherein according to the face position information collected by the first camera, adjusting the position of the first camera through the rotation mechanism, and controlling such that pictures taken by the first camera always place people to be taken in the central area of the pictures specifically comprises:

According to the face position information collected by the first camera, calculating the position of the face in the current picture taken for preview;

According to the calculated position where the face is at in the current picture taken for preview, further calculating deviation data with respect to placing people to be taken in the central area of the picture;

According to the deviation data, generating a corresponding position adjustment command to control the first camera to perform position adjustment;

According to the generated position adjustment command, adjusting the position of the first camera, and controlling such that pictures taken by the first camera always place people to be taken in the central area of the pictures.

In a further embodiment, the mobile terminal, wherein according to the deviation data, generating a corresponding position adjustment command to control the first camera to perform position adjustment further comprises: According to the deviation data, generating a corresponding lateral position adjustment command or vertical position adjustment command to control the first camera.

In a further embodiment, the mobile terminal, wherein according to the generated position adjustment command, adjusting the position of the first camera, and controlling such that pictures taken by the first camera always place people to be taken in the central area of the pictures further comprises:

When a lateral position adjustment command is generated, controlling to adjust the lateral position of the first camera, so as to control such that pictures taken by the first camera always place people to be taken in the central area of the pictures;

When a vertical position adjustment command is generated, controlling to adjust the vertical position of the first camera, so as to control such that pictures taken by the first camera always place people to be taken in the central area of the pictures.

In a further embodiment, the mobile terminal, wherein according to the face position information collected by the first camera, adjusting the position of the first camera through the rotation mechanism, and controlling such that pictures taken by the first camera always place people to be taken in the central area of the pictures further comprises:

Performing data processing on face feature data collected by the first camera, calculating the range of the face image, and calculating to obtain a central point of the face image according to the image range;

Calculating the relative position of the central point of the face image relative to the central point of the image of the first camera, and obtaining $\Delta X$ and $\Delta Y$, wherein $\Delta X$ represents the lateral position information of the central point of the face image relative to the central point of the image; $\Delta Y$ represents the vertical position information of the central point of the face image relative to the central point of the image;

According to the calculated data of $\Delta X$ and $\Delta Y$, generating a lateral position adjustment command and a vertical position adjustment command;

According to the generated lateral position adjustment command and vertical position adjustment command, respectively, controlling the given lateral position information of the central point of the face image relative to the central point of the image, adjusting the position of the second camera, such that $\Delta X$ trends to 0; and according to the given vertical position information of the central point of the face image relative to the central point of the image, adjusting the position of the second camera, such that $\Delta Y$ trends to 0.

In a further embodiment, the mobile terminal, wherein the first camera is a face recognition camera, and the second camera is a main camera.

In a further embodiment, the mobile terminal, wherein the mobile terminal is a cell phone, a tablet computer, or a laptop computer.

The mobile terminal camera-based method and system for dynamically capturing a face for video taking according to the present invention combine two cameras with different functions, use one camera for dynamic face recognition on a person to be taken, when the face position is recognized, adjust dynamic position of another camera according to the face position. As a result, a person to be taken is always at a proper shooting position of the camera, and pictures taken by the camera also always place people to be taken in the central area of the pictures. By using said smart picture taking device, when the picture taking device does not move or moves only a little, a subject to be taken can move in a larger range of the device shooting direction, without affecting the position of the subject to be taken in the pictures, the picture taking device enables dynamic capture of positions of the subject to be taken, and can promptly take pictures of the face, which provides convenience for users.

DETAILED DESCRIPTION

To make the objects, technical solutions and advantages of the present invention clearer and more specific, the present invention will be further described in detail below with reference to the accompanying drawings and embodiments. It should be understood that the specific embodiments described herein are only used to explain the present invention, not used to limit the present invention.

Figure 1:
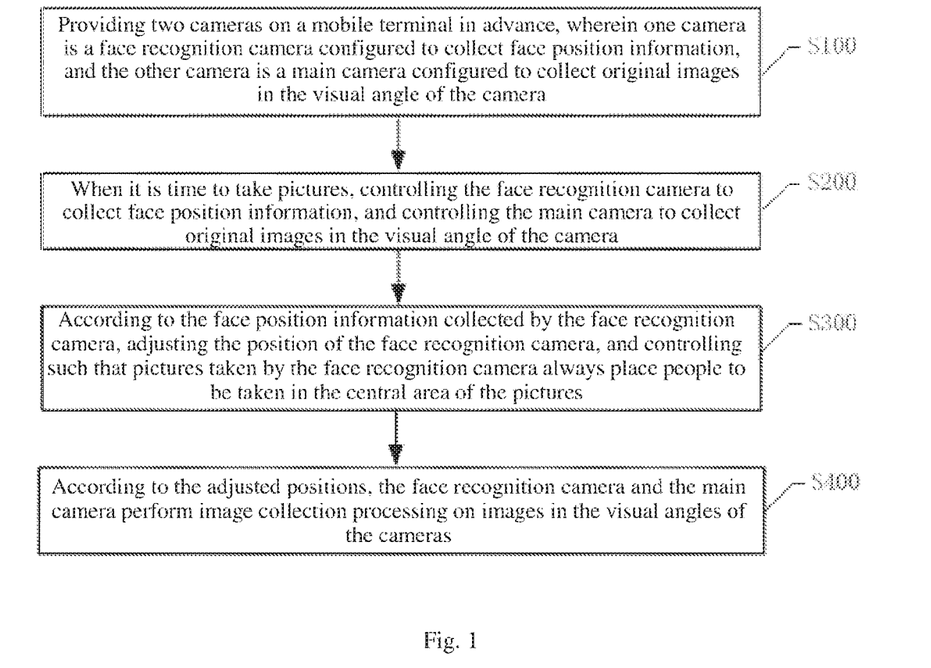
FIG. 1 depicts a flow chart of the mobile terminal camera-based method for dynamically capturing a face for video taking according to an exemplary embodiment of the present invention.

Please refer to FIG. 1, and FIG. 1 depicts a flow chart of the mobile terminal camera-based method for dynamically capturing a face for video taking according to an exemplary embodiment of the present invention.

Providing two cameras on a mobile terminal in advance, wherein one camera is a face recognition camera configured to collect face position information, and the other camera is a main camera configured to collect original images in the visual angle of the camera; (Block S100)

Figure 2:
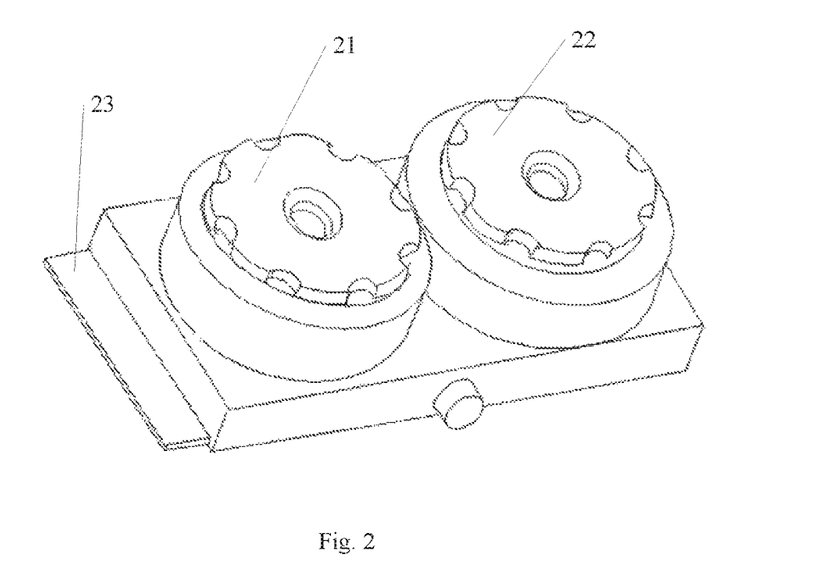
FIG. 2 depicts a schematic diagram of the camera module of the mobile terminal camera-based method for dynamically capturing a face for video taking according to an exemplary embodiment of the present invention.

In embodiments of the present invention, the mobile terminal is described with a cell phone as an example. In a specific implementation, two cameras are provided on the cell phone, please refer to FIG. 2, and FIG. 2 depicts a schematic diagram of the camera module of the mobile terminal camera-based method for dynamically capturing a face for video taking according to an exemplary embodiment of the present invention, wherein a face recognition camera 21 is configured to collect face position information and face feature data, the other camera is a main camera 22 configured to collect original images in the visual angle of the camera, the two cameras are provided on the same module to form a camera module, the camera module is connected to the data processing and control module via a flexible circuit board 23, the data processing and control module may control and adjust the camera module to make lateral position rotational adjustment or vertical position rotational adjustment according to the face position information collected by the face recognition camera 21, said lateral and vertical being defined according to the lateral and vertical directions of the pictures taken by the cameras; when the camera module makes lateral position rotation, the picture on the picture preview interface moves laterally, and when the camera module makes vertical position rotation, the picture on the picture preview interface moves vertically.

Figure 3:
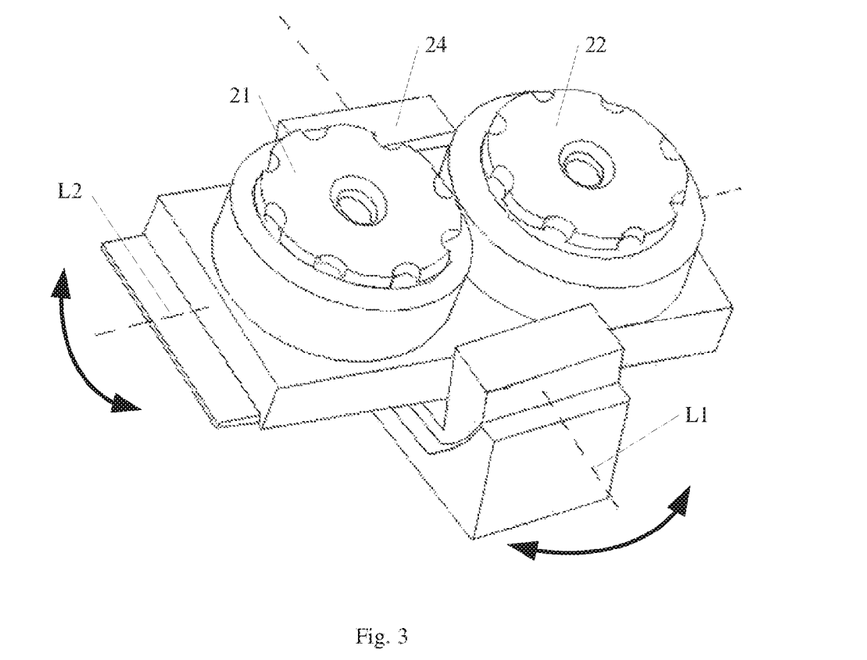
FIG. 3 depicts a schematic diagram of the installation of the camera module and the rotation mechanism of the mobile terminal camera-based method for dynamically capturing a face for video taking according to an exemplary embodiment of the present invention.

Furthermore, the camera module is disposed on the mobile terminal body through a rotation mechanism, referring to FIG. 3, FIG. 3 depicts a schematic diagram of the installation of the camera module and the rotation mechanism of the mobile terminal camera-based method for dynamically capturing a face for video taking according to an exemplary embodiment of the present invention, and two central lines of the rotation mechanism D are used as a lateral rotation axis L1 and a vertical rotation axis L2 of the camera module (as shown in FIG. 3). The integrated camera module can make lateral or vertical position rotational adjustment about the lateral or vertical rotation axis through the rotation mechanism D, which can greatly expand the shooting range of the camera module in two directions, lateral and vertical. Correspondingly, when the camera module is used to take pictures, the ranges of lateral and vertical movement adjustment of a terminal preview interface will be expanded accordingly. In embodiments of the present invention, since the integrated camera module can rotate in real time during shooting in both the lateral direction and the vertical direction, the lateral rotation and the vertical rotation of the camera module are combined to achieve rotation of the entire preview interface image plane of the mobile terminal in a large range, a face can be correctly recognized and tracked in such a large range, thereby realizing that the integrated camera module can move the shooting angle to any orientation where the face is at.

When it is time to take pictures, controlling the face recognition camera to collect face position information, and controlling the main camera to collect original images in the visual angle of the camera; (Block S200)

Figure 4:
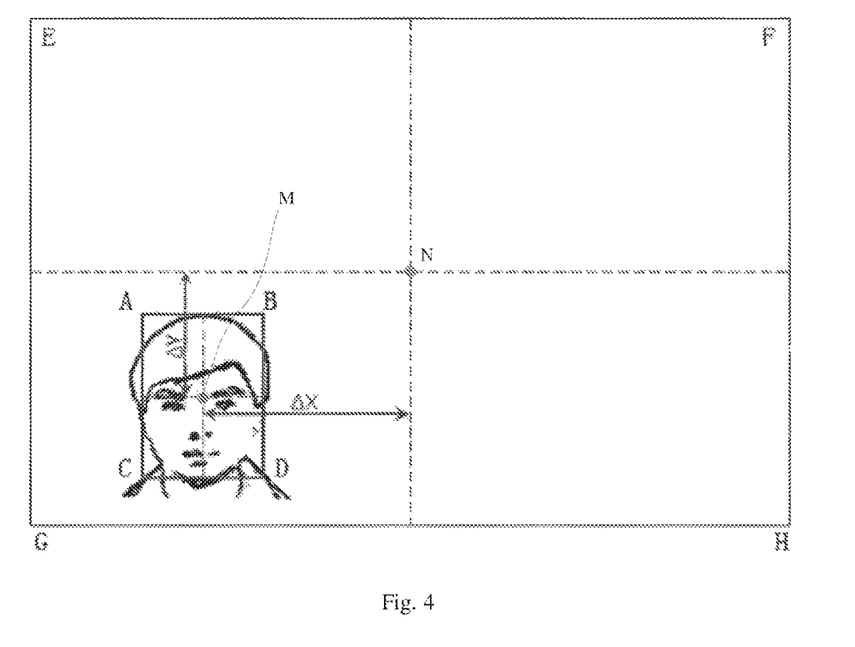
FIG. 4 depicts a schematic diagram of the face position information of the mobile terminal camera-based method for dynamically capturing a face for video taking according to an exemplary embodiment of the present invention.

In a specific implementation of the present invention, when the mobile terminal takes pictures of a face, the face recognition camera in the integrated camera module may be controlled to collect face position information, and the main camera in the integrated camera module may be controlled to collect original images in the visual angle of the camera;

During shooting, the face recognition camera is controlled to collect face position information and recognize the face position, i.e. by collecting the face position information, the position of a face on the entire preview interface can be recognized. Specifically referring to FIG. 4, FIG. 4 is a schematic diagram of the face position information in a preferred embodiment of the mobile terminal camera-based method for dynamically capturing a face for video taking according to the present invention, specifically, face feature data are collected through the face recognition camera, such as the left cheek edge position, left cheek edge position, head top position, and face chin position of a human face. At the same time, the main camera is used to collect original images in the visual angle of the camera. Then, the entire and complete face image information and face position information can be obtained by using the integrated camera module to shoot.

According to the face position information collected by the face recognition camera, adjusting the position of the face recognition camera, and controlling such that pictures taken by the face recognition camera always place people to be taken in the central area of the pictures; (Block S300)

A specific implementation of the present invention comprises the following:

According to the face position information collected by the face recognition camera, calculate the position of the face in the current picture taken for preview; (Block S301)

According to the calculated position where the face is at in the current picture taken for preview, further calculate deviation data with respect to placing people to be taken in the central area of the picture; (Block S302)

In blocks S301 and S302 above, the face position information is collected by the face recognition camera, relevant processing is performed to obtain deviation data with respect to placing people to be taken in the central area of the picture, and the specific processing of the entire process may be:

Performing data processing on face feature data collected by the face recognition camera, calculating the range of the face image, and calculating to obtain a central point of the face image according to the image range. (Block S3100)

Specifically, face feature data are collected through the face recognition camera, such as the left cheek edge position, left cheek edge position, head top position, and face chin position of a human face, based on which the range of the entire human face image (the range of the face image indicated by the rectangle ABCD in FIG. 4) on the image preview interface (as indicated by the rectangle EFGH in FIG. 4) is calculated. According to the image range rectangle ABCD, the central point position of the human face image can be further obtained through calculation (the coordinate position of the point M shown in FIG. 4), and the point M is the central point of the rectangle EFGH.

Calculating the relative position of the central point of the face image relative to the central point of the image of the face recognition camera, and obtaining ΔX and ΔY, wherein ΔX represents the lateral position information of the central point of the face image relative to the central point of the image; ΔY represents the vertical position information of the central point of the face image relative to the central point of the image; (Block S3200)

Specifically, according to the obtained coordinates of the central point of the image preview interface, namely the central point position of the image of the face recognition camera (the coordinate position of the point N shown in FIG. 4), and the position of the central point M of the face image obtained in block S201, relative positions ΔX and ΔY on the lateral and vertical direction of two points, M and N, are obtained through calculation (as shown in FIG. 4). Wherein, ΔX represents the lateral position information of the central point of the face image relative to the central point of the image; ΔY represents the vertical position information of the central point of the face image relative to the central point of the image.

According to the deviation data, generating a corresponding position adjustment command to control the face recognition camera to perform position adjustment; (Block S303)

For example, according to the deviation data obtained in block S302, generating a corresponding lateral position adjustment command or vertical position adjustment command to control the face recognition camera.

In a specific embodiment of the present invention, a lateral position adjustment command and a vertical position adjustment command may be generated, respectively, according to the calculated ΔX and ΔY data.

According to the generated position adjustment commands, adjusting the position of the face recognition camera, and controlling such that pictures taken by the face recognition camera always place people to be taken in the central area of the pictures. (Block S304)

Figure 5:
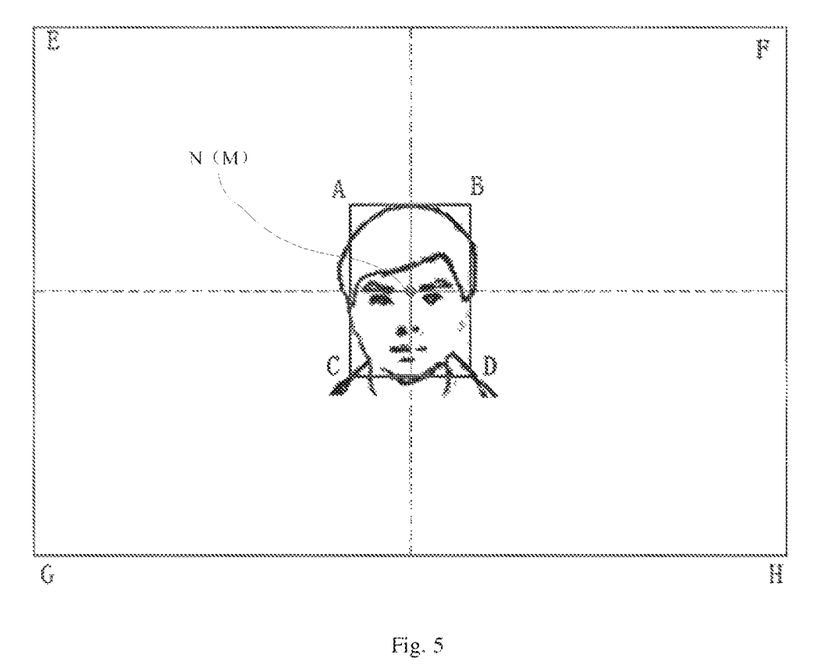
FIG. 5 depicts a schematic diagram that a face image is in the center of the mobile terminal camera-based method for dynamically capturing a face for video taking according to an exemplary embodiment of the present invention.

For example, the generated lateral position adjustment command and vertical position adjustment command may be used to control the entire camera module to make lateral and vertical position rotational offset, such that the face image is made to move laterally and vertically on the preview interface, to control such that pictures taken by the face recognition camera always place people to be taken in the central area of the pictures. Specifically, please refer to FIG. 5, and FIG. 5 is a schematic diagram that a face image is in the center in a preferred embodiment of the mobile terminal camera-based method for dynamically capturing a face for video taking according to the present invention. During specific implementation, therefore, block S304 may specifically comprise:

When a lateral position adjustment command is generated, controlling to adjust the lateral position of the face recognition camera, so as to control such that pictures taken by the face recognition camera always place people to be taken in the central area of the pictures; (Block S3041)

Specifically, the lateral position adjustment command generated according to the ΔX data controls the rotation mechanism to drive the entire camera module to make lateral position rotation, and controls ΔX to trend to 0 (with the central point N of the preview image as the origin of coordinates). Namely, a face image on the preview interface is made to move laterally, such that the central point M of the face image moves left and right to keep the X-coordinate of the point M on the same straight line with the X-coordinate of the central point N of the preview image.

When a vertical position adjustment command is generated, controlling to adjust the vertical position of the face recognition camera, so as to control such that pictures taken by the face recognition camera always place people to be taken in the central area of the pictures. (Block S3042)

Specifically, the vertical position adjustment command generated according to the ΔY data controls the rotation mechanism to drive the entire camera module to make vertical position rotation, and controls ΔY to trend to 0 (with the central point N of the preview image as the origin of coordinates). Namely, a face image on the preview interface is made to move vertically, such that the central point M of the face image moves up and down to keep the Y-coordinate of the point M on the same straight line with the Y-coordinate of the central point N of the preview image.

It can be seen that through the generated lateral position adjustment command and vertical position adjustment command, the present invention controls and calculates to obtain the lateral position information of the central point of the face image relative to the central point of the image, adjusts the position of the main camera, such that ΔX trends to 0; and according to the calculated vertical position information of the central point of the face image relative to the central point of the image, adjusts the position of the main camera, such that ΔY trends to 0, thereby controlling such that pictures taken by the face recognition camera always place people to be taken in the central area of the pictures, namely first moving the central point M of the face image laterally by ΔX units, then moving vertically by ΔY, such that the central point M of the face image moves to overlap with the central point N of the preview image (as shown in FIG. 5).

Relative to a regular mobile device, the method according to the present invention uses the camera module in the embodiments to provide all-dimensional rotation in the shooting direction, can capture face image information in a large range, and by controlling to rotate the integrated camera module, enables the face image collected by the camera to move to the central position of the preview interface in real time. The use of the present invention can greatly increase the movement range of a person to be taken and provide convenience to users.

Figure 6:
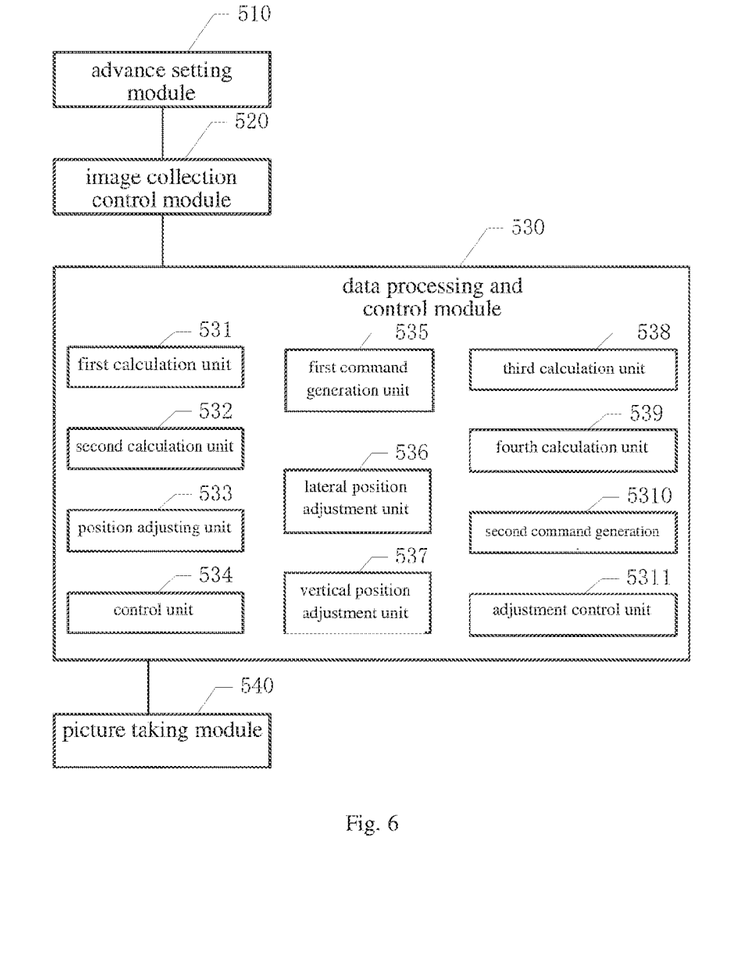
FIG. 6 depicts a block diagram of the principle of the mobile terminal camera-based system for dynamically capturing a face for video taking according to an exemplary embodiment of the present invention.

In addition, the present invention further provides a mobile terminal camera-based system for dynamically capturing a face for video taking, as shown in FIG. 6, which is a block diagram of the principle of a preferred embodiment of the mobile terminal camera-based system for dynamically capturing a face for video taking according to the present invention, said system comprising:

An advance setting module 510, configured to provide two cameras on a mobile terminal in advance, wherein one camera is a face recognition camera configured to collect face position information, and the other camera is a main camera configured to collect original images in the visual angle of the camera;

An image collection control module 520, configured to, during shooting, control the face recognition camera to collect face position information, and control the main camera to collect original images in the visual angle; as described specifically above.

A data processing and control module 530, configured to, according to the face position information collected by the face recognition camera, adjust the position of the face recognition camera, and control such that pictures taken by the face recognition camera always place people to be taken in the central area of the pictures; as described specifically above.

A picture taking module 540, configured to control the face recognition camera and the main camera to perform, according to the adjusted positions, image collection processing on images in the visual angles of the cameras; as described specifically above.

Preferably, the data processing and control module 530 comprises:

A first calculation unit 531, configured to, according to the face position information collected by the face recognition camera, calculate the position of the face in the current picture taken for preview; as described specifically above.

A second calculation unit 532, configured to, according to the calculated position where the face is at in the current picture taken for preview, further calculate deviation data with respect to placing people to be taken in the central area of the picture; as described specifically above.

A position adjusting unit 533, configured to, according to the deviation data, generate a corresponding position adjustment command to control the face recognition camera to perform position adjustment; as described specifically above.

A control unit 534, configured to, according to the generated position adjustment command, adjust the position of the face recognition camera, and control such that pictures taken by the face recognition camera always place people to be taken in the central area of the pictures; as described specifically above.

A first command generation unit 535, configured to, according to the deviation data, generate a corresponding lateral position adjustment command or vertical position adjustment command to control the face recognition camera; as described specifically above.

A lateral position adjustment unit 536, configured to, when a lateral position adjustment command is generated, control to adjust the lateral position of the face recognition camera, so as to control such that pictures taken by the face recognition camera always place people to be taken in the central area of the pictures; as described specifically above.

A vertical position adjustment unit 537, configured to, when a vertical position adjustment command is generated, control to adjust the vertical position of the face recognition camera, so as to control such that pictures taken by the face recognition camera always place people to be taken in the central area of the pictures; as described specifically above.

Preferably, the data processing and control module 530 comprises:

A third calculation unit 538, configured to perform data processing on face feature data collected by the face recognition camera, calculate the range of the face image, and calculate to obtain a central point of the face image according to the image range; as described specifically above.

A fourth calculation unit 539, configured to calculate the relative position of the central point of the face image relative to the central point of the image of the face recognition camera, and obtain $\Delta X$ and $\Delta Y$, wherein $\Delta X$ represents the lateral position information of the central point of the face image relative to the central point of the image; $\Delta Y$ represents the vertical position information of the central point of the face image relative to the central point of the image; as described specifically above.

A second command generation unit 5310, configured to, according to the calculated data of $\Delta X$ and $\Delta Y$, generate a lateral position adjustment command and a vertical position adjustment command; as described specifically above.

An adjustment control unit 5311, configured to, according to the generated lateral position adjustment command and vertical position adjustment command, respectively, control the given lateral position information of the central point of the face image relative to the central point of the image, adjust the position of the main camera, such that $\Delta X$ trends to 0; and according to the given vertical position information of the central point of the face image relative to the central point of the image, adjusting the position of the main camera, such that $\Delta Y$ trends to 0; as described specifically above.

The present invention further provides a mobile terminal, comprising a mobile terminal body, wherein the mobile terminal further comprises two cameras provided on the mobile terminal body, wherein one camera is a face recognition camera configured to collect face position information, and the other camera is a main camera configured to collect original images in the visual angle of the camera; the main camera and the face recognition camera are provided on the same module. The mobile terminal further comprises processors connected to the face recognition camera and the main camera, respectively, and the camera module formed by the face recognition camera and the main camera may be electrically connected to the processors via a flexible circuit board. In addition, the processors are used to run the above mobile terminal camera-based system for dynamically capturing a face for video taking or implement the above mobile terminal camera-based method for dynamically capturing a face for video taking.

The mobile terminal, wherein the mobile terminal is a cell phone, a tablet computer, or a laptop computer.

In summary, the mobile terminal camera-based method, system and mobile terminal for dynamically capturing a face for video taking according to the present invention combine two cameras with different functions, use one camera for dynamic face recognition on a person to be taken, when the face position is recognized, according to the face position and with dynamic position adjustment of a face recognition camera on the device, no matter where a face is, the face recognition camera calculates the face position, the calculated position data are provided to a central processor in real time, and the central processor adjusts the camera position according to the actual position of the subject to be taken. As a result, a person to be taken is always at a proper shooting position of the camera, and pictures taken by the camera also always place people to be taken in the central area of the pictures. By using said smart picture taking device, when the picture taking device does not move or moves only a little, a subject to be taken can move in a larger range of the device shooting direction, without affecting the position of the subject to be taken in the pictures, the picture taking device provides dynamic capture of positions of the subject to be taken, and can promptly take pictures of the face, which provides convenience for users.

Naturally, a person skilled in the art should understand that all or some flows in the methods in the embodiments above may be implemented by using a computer program to instruct relevant hardware (e.g. processors, controllers, etc.), the program may be stored in a computer readable memory medium, and during execution, the program may comprise the flows set forth in the above method embodiments. Wherein, the memory medium may be a memory, a magnetic disk or an optical disk.

It should be understood that applications of the present invention are not limited by the above examples. To a person skilled in the art, improvements or modification may be made according to the above description, and all these improvements and modifications shall be encompassed in the scope of the claims appended to the present invention.

The invention claimed is:

1. A mobile terminal camera-based method for dynamically capturing a face for video taking, comprising:
during shooting, using a first camera to collect face position information, and using a second camera to collect original images in a visual angle, wherein the first camera and the second camera comprise a camera module disposed on a body of a mobile terminal through a rotation mechanism presenting two central lines used as a lateral rotation axis and a vertical rotation axis of the camera module to make lateral and vertical position rotational adjustment about the lateral rotation axis and the vertical rotation axis through the rotation mechanism to expand a shooting range of the camera module in lateral and vertical directions and to expand ranges of lateral and vertical movement adjustments of a terminal preview interface;
according to the face position information collected by the first camera, adjusting a position of the first camera through the rotation mechanism such that pictures taken by the first camera place people in a central area of the pictures;
according to the adjusted position, the first camera and the second camera perform image collection processing on the original images in the visual angle.

2. The mobile terminal camera-based method for dynamically capturing a face for video taking according to claim 1, wherein the collecting of the face position information includes recognizing a face position.

3. The mobile terminal camera-based method for dynamically capturing a face for video taking according to claim 1, wherein the adjusting the position of the first camera through the rotation mechanism comprises:
according to the face position information collected by the first camera, calculating a position of a face in a current picture taken for preview;
according to the calculated position, further calculating deviation data with respect to placing people in the central area of the pictures;
according to the deviation data, generating a position adjustment command to perform position adjustment on the first camera;
according to the generated position adjustment command, adjusting the position of the first camera such that the pictures taken by the first camera place the people in the central area of the pictures.

4. The mobile terminal camera-based method for dynamically capturing a face for video taking according to claim 3, wherein the generating the position adjustment command comprises:
according to the deviation data, generating at least one of a lateral position adjustment command and a vertical position adjustment command to perform the position adjustment on the first camera.

5. The mobile terminal camera-based method for dynamically capturing a face for video taking according to claim 4, wherein the adjusting of the position of the first camera comprises:
when a lateral position adjustment command is generated, adjusting a lateral position of the first camera such that the pictures taken by the first camera place people in the central area of the pictures;
when a vertical position adjustment command is generated, adjusting a vertical position of the first camera such that the pictures taken by the first camera place people in the central area of the pictures.

6. The mobile terminal camera-based method for dynamically capturing a face for video taking according to claim 4, wherein the adjusting the position of the first camera through the rotation mechanism comprises:
performing data processing on face feature data collected by the first camera, calculating an image range of a face image, and calculating a central point of the face image according to the image range;
calculating a relative position of the central point of the face image relative to a central point of the current picture, and obtaining a $\Delta X$ and a $\Delta Y$, wherein the $\Delta X$ represents a lateral position information of the central point of the face image relative to the central point of the current picture; and wherein the $\Delta Y$ represents a vertical position;
information of the central point of the face image relative to the central point of the current picture;
according to the $\Delta X$ and the $\Delta Y$, generating the lateral position adjustment command and the vertical position adjustment command;
according to the generated lateral position adjustment command and the vertical position adjustment command, adjusting a position of the second camera such that the $\Delta X$ trends to 0 and the $\Delta Y$ trends to 0.

7. The mobile terminal camera-based method for dynamically capturing a face for video taking according to claim 1, wherein the first camera is a face recognition camera and the second camera is a main camera.

8. A mobile terminal camera-based system for dynamically capturing a face for video taking, comprising one or more modules configured to:
during shooting, use a face recognition camera to collect face position information, and use a main camera to collect original images in a visual angle, wherein the face recognition camera and the main camera comprise a camera module on a mobile terminal through a rotation mechanism presenting two central lines used as a lateral rotation axis and a vertical rotation axis of the camera module to make lateral and vertical position rotational adjustment about the lateral rotation axis and the vertical rotation axis through the rotation mechanism to expand a shooting range of the camera module in lateral and vertical directions and to expand ranges of lateral and vertical movement adjustments of a terminal preview interface;
according to the face position information collected by the face recognition camera, adjust a position of the face recognition camera such that pictures taken by the face recognition camera place people in a central area of the pictures; and
use the face recognition camera and the main camera to perform, according to the adjusted position, image collection processing on the original images in the visual angle.

9. The mobile terminal camera-based system for dynamically capturing a face for video taking according to claim 8, wherein the collecting of the face position information includes recognizing a face position.

10. The mobile terminal camera-based system for dynamically capturing a face for video taking according to claim 8, wherein the adjusting of the position of the face recognition camera comprises:
- according to the face position information collected by the face recognition camera, calculate a position of a face in a current picture taken for preview;
- according to the calculated position, further calculate deviation data with respect to placing people in the central area of the pictures;
- according to the deviation data, generate a position adjustment command to perform position adjustment on the face recognition camera;
- according to the generated position adjustment command, adjust the position of the face recognition camera such that the pictures taken by the face recognition camera always place people in the central area of the pictures.

11. The mobile terminal camera-based system for dynamically capturing a face for video taking according to claim 8, wherein the generating the position adjustment command comprises:
- according to the deviation data, generate at least one of a lateral position adjustment command and a vertical position adjustment command to perform the position adjustment on the face recognition camera.

12. The mobile terminal camera-based system for dynamically capturing a face for video taking according to claim 11, wherein the adjusting of the position of the face recognition camera comprises:
- when a lateral position adjustment command is generated, adjust a lateral position of the face recognition camera such that the pictures taken by the face recognition camera place people in the central area of the pictures; and
- when a vertical position adjustment command is generated, adjust a vertical position of the face recognition camera such that the pictures taken by the face recognition camera place people in the central area of the pictures.

13. The mobile terminal camera-based system for dynamically capturing a face for video taking according to claim 11, wherein the adjusting the position of the face recognition camera comprises:
- perform data processing on face feature data collected by the face recognition camera, calculate an image range of a face image, and calculate a central point of the face image according to the image range;
- calculate a relative position of the central point of the face image relative to a central point of the current picture, and obtain a $\Delta X$ and a $\Delta Y$, wherein the $\Delta X$ represents a lateral position information of the central point of the face image relative to the central point of the current picture; and wherein the $\Delta Y$ represents a vertical position information of the central point of the face image relative to the central point of the current picture;
- according to the $\Delta X$ and the $\Delta Y$, generate the lateral position adjustment command and the vertical position adjustment command;
- according to the generated lateral position adjustment command and the vertical position adjustment command, adjust a position of the main camera such that the $\Delta X$ trends to 0 and the $\Delta Y$ trends to 0.

14. A mobile terminal, comprising:
- a first camera and a second camera forming a camera module disposed on a body of the mobile terminal through a rotation mechanism presenting two central lines used as a lateral rotation axis and a vertical rotation axis of the camera module to make lateral and vertical position rotational adjustment about the lateral rotation axis and the vertical rotation axis through the rotation mechanism to expand a shooting range of the camera module in lateral and vertical directions and to expand ranges of lateral and vertical movement adjustments of a terminal preview interface;
- one or more processors;
- a memory; and
- one or more programs, wherein said one or more programs are stored in the memory and configured to be executed by said one or more processors, and said one or more programs comprise commands for the following operations:
- during shooting, using the first camera to collect face position information, and using the second camera to collect original images in a visual angle;
- according to the face position information collected by the first camera, adjusting a position of the first camera through the rotation mechanism such that pictures taken by the first camera place people in a central area of the pictures; and
- according to the adjusted positions, the first camera and the second camera perform image collection processing on the original images in the visual angle.

15. The mobile terminal according to claim 14, wherein the adjusting the position of the first camera through the rotation mechanism comprises:
- according to the face position information collected by the first camera, calculating a position of a face in a current picture taken for preview;
- according to the calculated position, further calculating deviation data with respect to placing people in the central area of the pictures;
- according to the deviation data, generating a position adjustment command to perform position adjustment on the first camera;
- according to the generated position adjustment command, adjusting the position of the first camera such that the pictures taken by the first camera place the people in the central area of the pictures.

16. The mobile terminal according to claim 14, wherein the generating the position adjustment command comprises:
- according to the deviation data, generating at least one of a lateral position adjustment command and a vertical position adjustment command to perform the position adjustment on the first camera.

17. The mobile terminal according to claim 16, wherein the adjusting of the position of the first camera comprises:
- when a lateral position adjustment command is generated, adjusting a lateral position of the first camera such that the pictures taken by the first camera place people in the central area of the pictures;
- when a vertical position adjustment command is generated, adjusting a vertical position of the first camera such that the pictures taken by the first camera place people in the central area of the pictures.

18. The mobile terminal according to claim 16, wherein the adjusting the position of the first camera through the rotation mechanism comprises:
- performing data processing on face feature data collected by the first camera, calculating an image range of a face image, and calculating a central point of the face image according to the image range;
- calculating a relative position of the central point of the face image relative to a central point of the current picture, and obtaining a $\Delta X$ and a $\Delta Y$, wherein the $\Delta X$ represents a lateral position information of the central point of the face image relative to the central point of the current picture; and wherein the ΔY represents a vertical position information of the central point of the face image relative to the central point of the current picture;

according to the ΔX and the ΔY, generating the lateral position adjustment command and the vertical position adjustment command;

according to the generated lateral position adjustment command and the vertical position adjustment command, adjusting a position of the second camera such that the ΔX trends to 0 and the ΔY trends to 0.

19. The mobile terminal according to claim 14, wherein the first camera is a face recognition camera and the second camera is a main camera.

20. The mobile terminal according to claim 14, wherein the mobile terminal is one of a cell phone, a tablet computer, and a laptop computer.

* * * * *